J. V. UPINGTON.
Sulky.
No. 221,631. Patented Nov. 11, 1879.
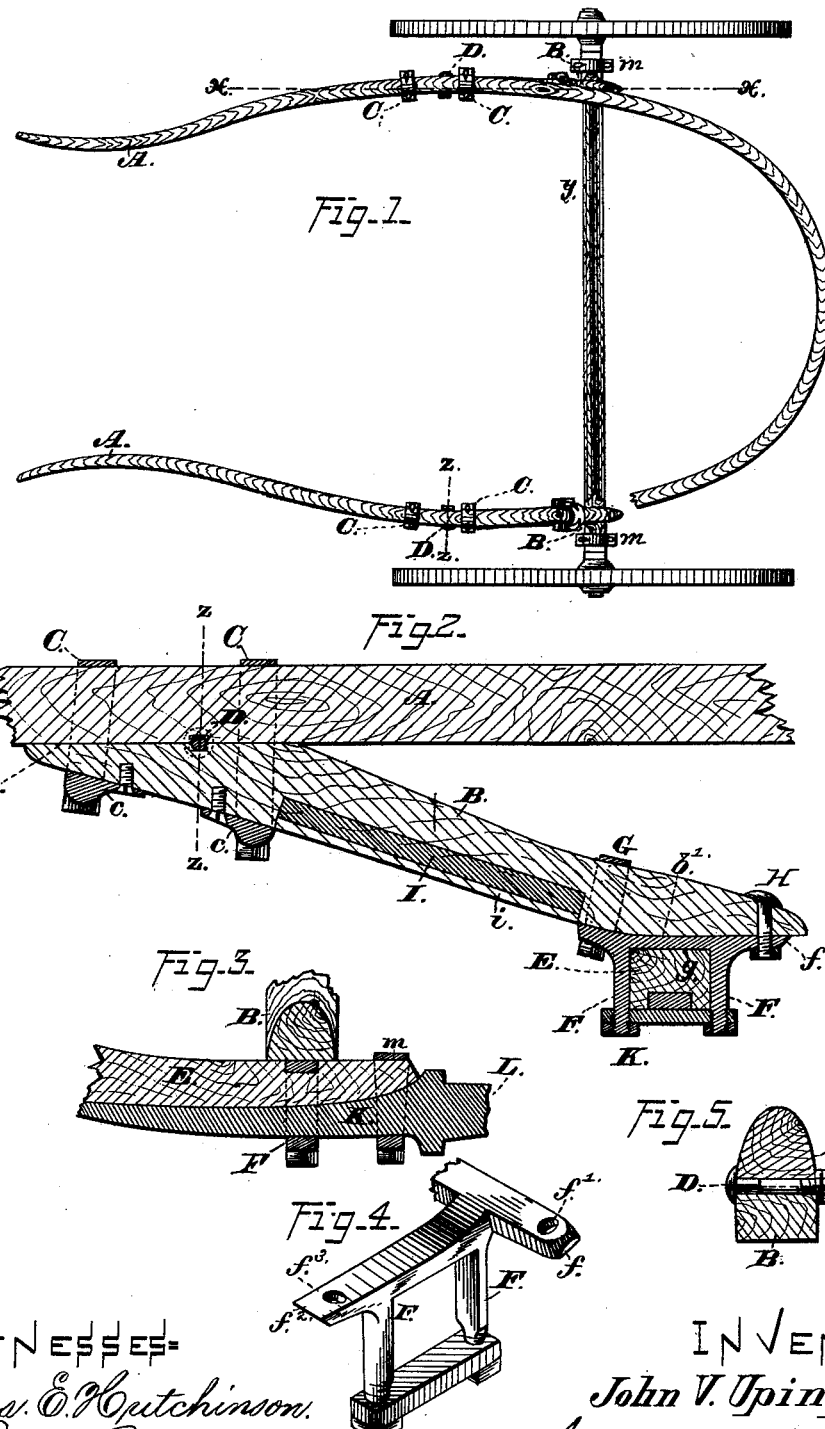

UNITED STATES PATENT OFFICE.

JOHN V. UPINGTON, OF LEXINGTON, KENTUCKY, ASSIGNOR OF ONE-HALF OF HIS RIGHT TO JAMES T. UPINGTON, OF SAME PLACE.

IMPROVEMENT IN SULKIES.

Specification forming part of Letters Patent No. 221,631, dated November 11, 1879; application filed October 8, 1879.

*To all whom it may concern:*

Be it known that I, JOHN V. UPINGTON, of Lexington, in the county of Fayette and State of Kentucky, have invented certain new and useful Improvements in Sulkies, of which the following is a specification.

This invention relates to certain improvements in sulkies and other similar vehicles; and it has for its object to provide an improved means of attaching the springs to axle and the shafts, and, further, to strengthen the spring between its connections with the axle and the shaft of the vehicle.

To this end the invention consists, first, in connecting the axles of sulkies with wooden re-enforced springs, said connection being effected through the medium of a clip of novel construction, the peculiarities of which consist in forming said clip with legs to embrace the sides of the axle and connect with a tie-piece, the body of the clip being formed at each end with projections extending somewhat beyond the legs of the clips, the extension at one end terminating in two lateral arms, which project over each side of the spring when applied thereto, and having openings through which the ends of the clips that surround the spring pass, and to which are applied fastening-nuts, the other extension of the said clip being of a width about equal to the width of the spring, and which also has an opening to receive the single shank of a clip or a T-headed bolt; second, in the combination of the axle, having a clip provided with extensions at each side, with the spring of the vehicle provided with clips passing through said extensions, and secured to the same, whereby the spring is held securely to its seat on the axle, as more fully hereinafter specified; third, in the combination, with the spring and the shaft and the clips by which they are secured together, of a transverse bolt passing through a recess at the line of juncture of the two parts, for the reception of a bolt which acts as a dowel to prevent the longitudinal displacement of the parts, as more fully hereinafter specified.

In the drawings, Figure 1 represents a top view of a sulky, showing my improvement. Fig. 2 represents a section on line $x\,x$ of Fig. 1. Fig. 3 is a section on line $y\,y$, Fig. 1, omitting the wheel. Fig. 4 is a detached perspective view of the axle-clip; and Fig. 5 is a section on line $z\,z$, Figs. 1 and 2.

The letter A indicates the shafts of the vehicle, and B the springs thereof, to which the shafts are secured. Said springs are beveled at their inner ends, as shown at $b$, and are attached to the shafts by means of clips C and clip-ties $c$. Said shafts are formed with flat seats for the beveled ends of the springs, and at the point of juncture of said springs and shaft are formed recesses for the reception of a bolt, D, which acts as a dowel and prevents the longitudinal displacement of the parts. The rear end of each spring is beveled on its under side, as shown at $b'$, so as to rest in proper position on the axle E.

The letter F indicates clips, which embrace the axle, one near each end. Said clips are each formed with extensions $f$ in front, at each side, having apertures $f'$, and with a rearward extension, $f^2$, having apertures $f^3$. The said clips are secured to the axle, which is recessed transversely at $g$ for the reception of the upper parts of the clips. The extensions $f$ form clip-ties for the clips G, which are secured to the spring in front of the axle, and pass through the apertures $f'$, being secured by means of nuts $h$, while the rearward extensions $f^2$ receive the single shanks of the clips or T-headed bolts H, the whole forming a secure connection for the spring and axle, by which all lateral or longitudinal movement will be prevented.

The clip is of a peculiar construction, which adapts it for connecting the spring with the axle when these parts are arranged transversely to each other, and it is formed with legs for embracing the axle and for connecting with a tie-piece. The body of the clip is formed with projections at each end beyond the legs of the clip, one of said extensions terminating in two lateral arms having apertures, which project over each side of the spring when applied thereto, for receiving the ends of the clips that surround the spring, and to which are applied fastening-nuts, while the other of said extensions is made of a width about equal to the width of the spring, and which also has an opening to receive the single shank of a clip or T-headed bolt.

By this construction the spring can be seated transversely to the axle and securely confined thereon by the clips which surround the spring on each side of the axle.

The letter I indicates a supplementary spring of metal let into a longitudinal recess in each wooden spring, and i a strip of wood let into said recess to conceal the metallic spring. Said strip, however, may be omitted, and the metal spring left flush with the lower side of the axle, if desired. The metal spring extends from the point of junction of the wooden spring with the axle to the point of juncture of such spring with the shaft, and serves to prevent the settling or breaking of the spring, which is a serious objection in the ordinarily-constructed springs.

The letter K indicates a re-enforce let into a longitudinal recess on the under side of the axle. The said re-enforce preferably is formed with the spindle L, and held in place by the clip which secures the spring to the axle and the supplementary clip m, secured over the outer end of the axle.

What I claim is—

1. The combination, with the shafts of a sulky, the axle, and the re-enforced wooden springs thereof, of a connecting-clip formed with legs for embracing the axle and connecting with a tie-piece, and with a single extension at one end having a single aperture, and with an extension at the other end with lateral arms having apertures, said apertures receiving the ends of the clips or connections G H of the spring for connecting it with the clip surrounding the axle, all substantially as described.

2. In combination with the axle having a clip provided with extensions at each side, the springs of the vehicle provided with clips passing through said extensions and secured to the same, whereby the spring is held securely to its seat on the axle, substantially as specified.

3. In combination with the spring and shaft and the clips by which they are secured together, a transverse bolt passing through an aperture at the juncture of the parts, and serving as a dowel to prevent longitudinal displacement of the parts, substantially as specified.

In testimony that I claim the foregoing I have hereunto set my hand in the presence of the subscribing witnesses.

JOHN V. UPINGTON.

Witnesses:
  THOS. I. MONTAGUE,
  D. S. MCFARLAND.